(No Model.)   7 Sheets—Sheet 1.

K. V. KARLANDER.
MACHINE FOR MAKING NETS.

No. 597,909.   Patented Jan. 25, 1898.

Witnesses
Chas H. Smith
J. Staib

Inventor
K. V. Karlander
per Lemuel W. Serrell
Atty.

(No Model.) 7 Sheets—Sheet 2.

K. V. KARLANDER.
MACHINE FOR MAKING NETS.

No. 597,909. Patented Jan. 25, 1898.

Witnesses
Chas H Smith
J. Staib

Inventor
K. V. Karlander
per Lemuel W. Serrell
Atty.

(No Model.) 7 Sheets—Sheet 3.
K. V. KARLANDER.
MACHINE FOR MAKING NETS.
No. 597,909. Patented Jan. 25, 1898.
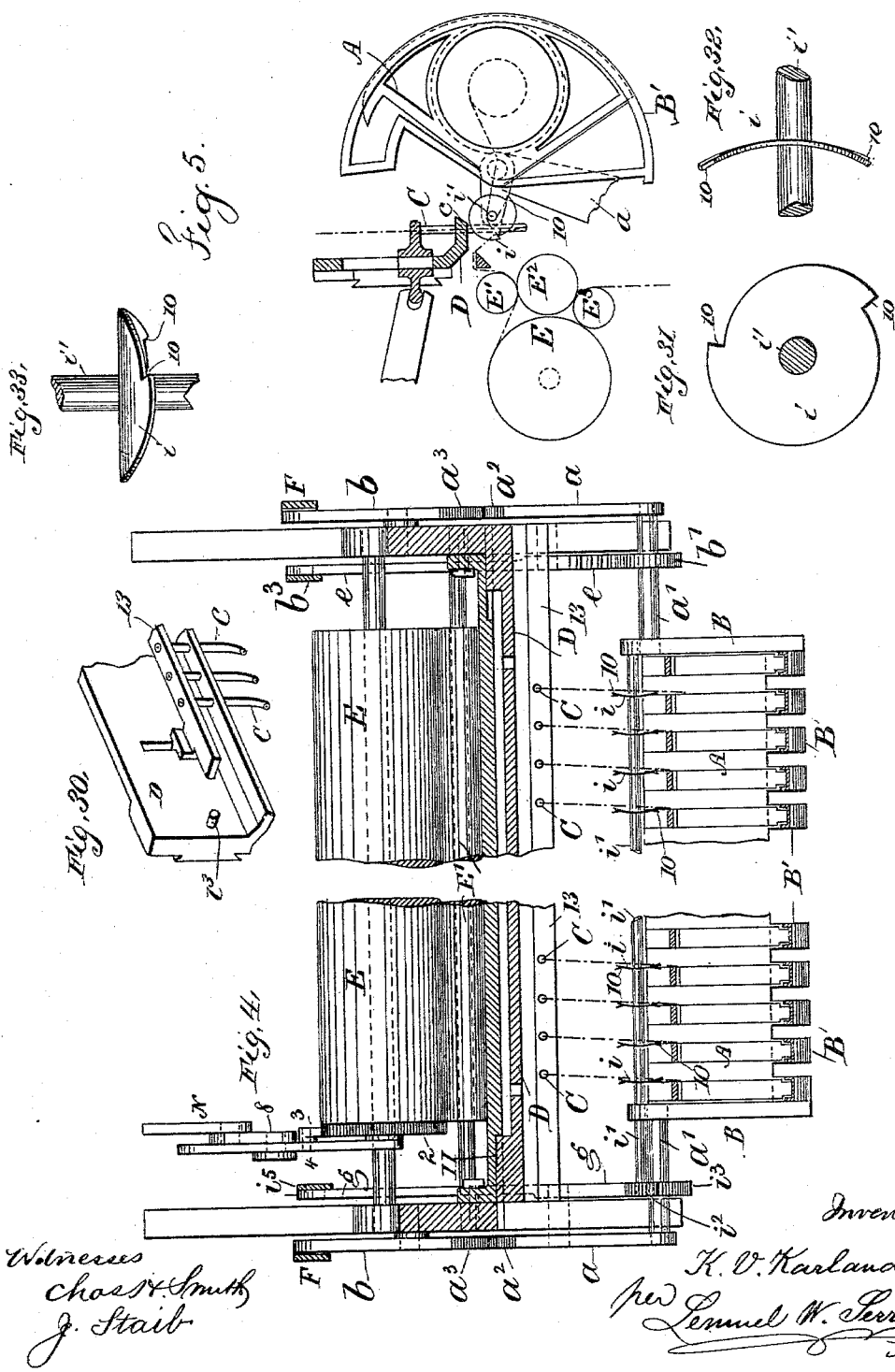
Witnesses
Chas H Smith
J. Staib
Inventor
K. V. Karlander
per Lemuel W. Serrell
Atty

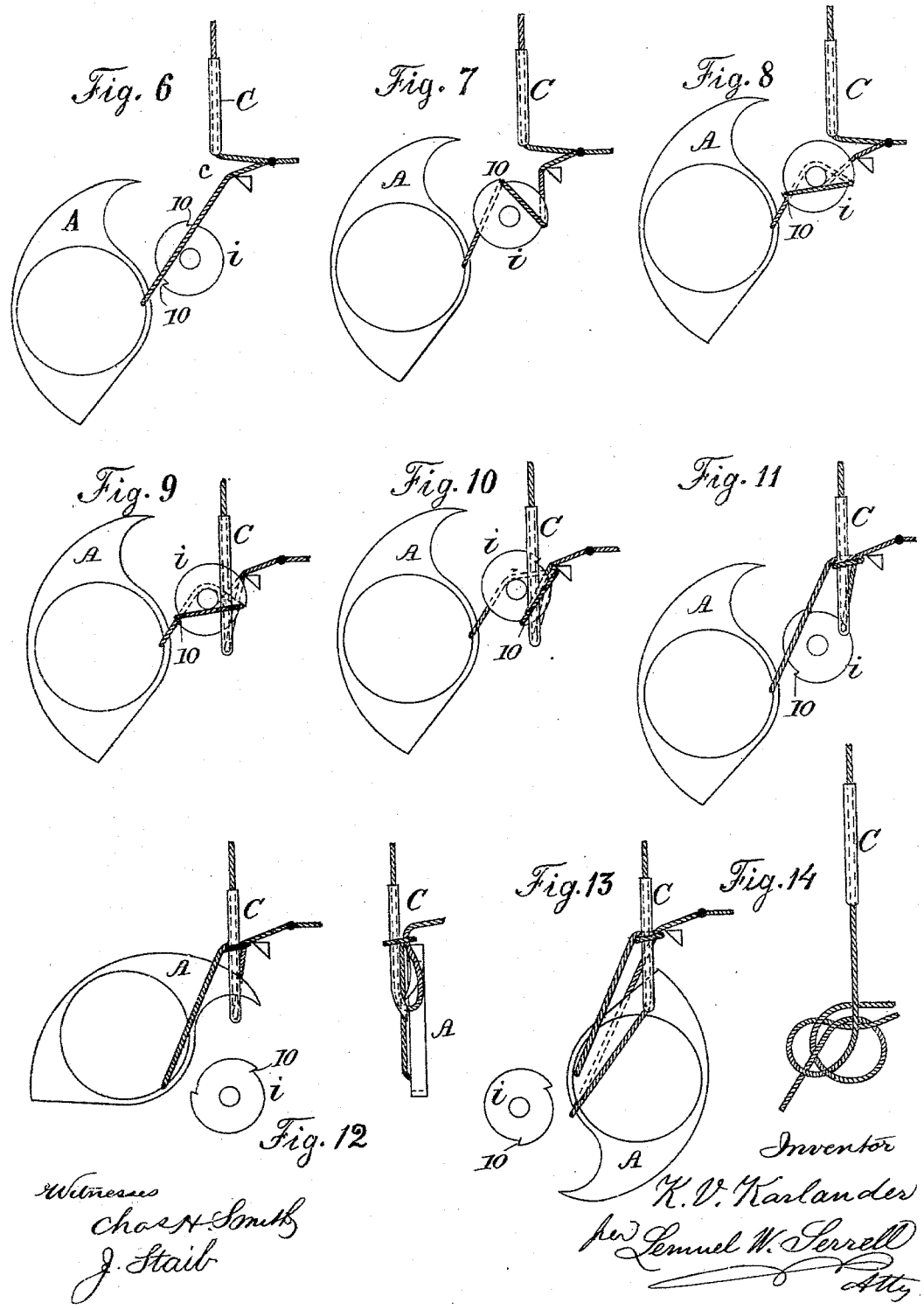

(No Model.) 7 Sheets—Sheet 5.
K. V. KARLANDER.
MACHINE FOR MAKING NETS.
No. 597,909. Patented Jan. 25, 1898.
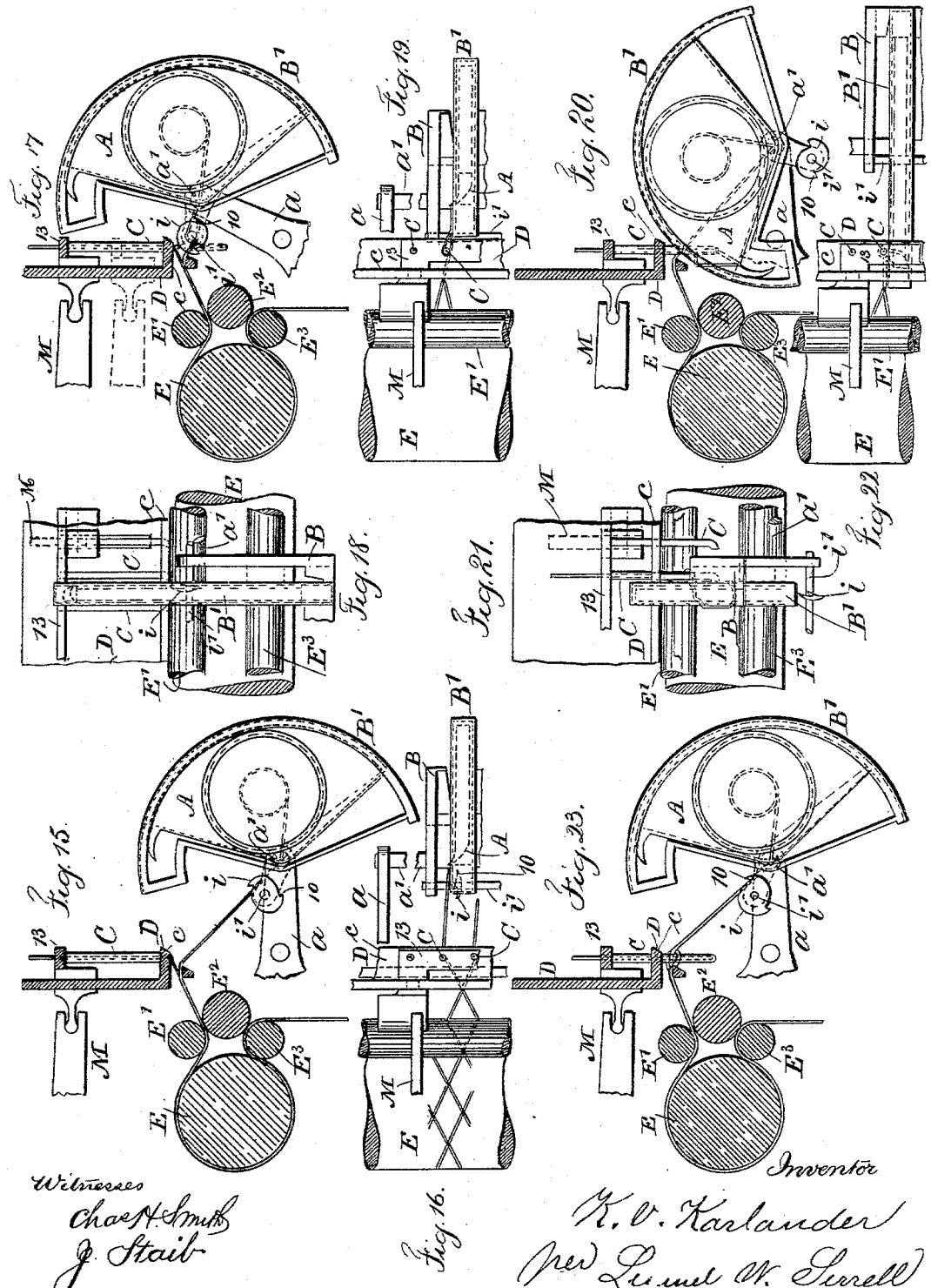

(No Model.) 7 Sheets—Sheet 6.
K. V. KARLANDER.
MACHINE FOR MAKING NETS.
No. 597,909. Patented Jan. 25, 1898.
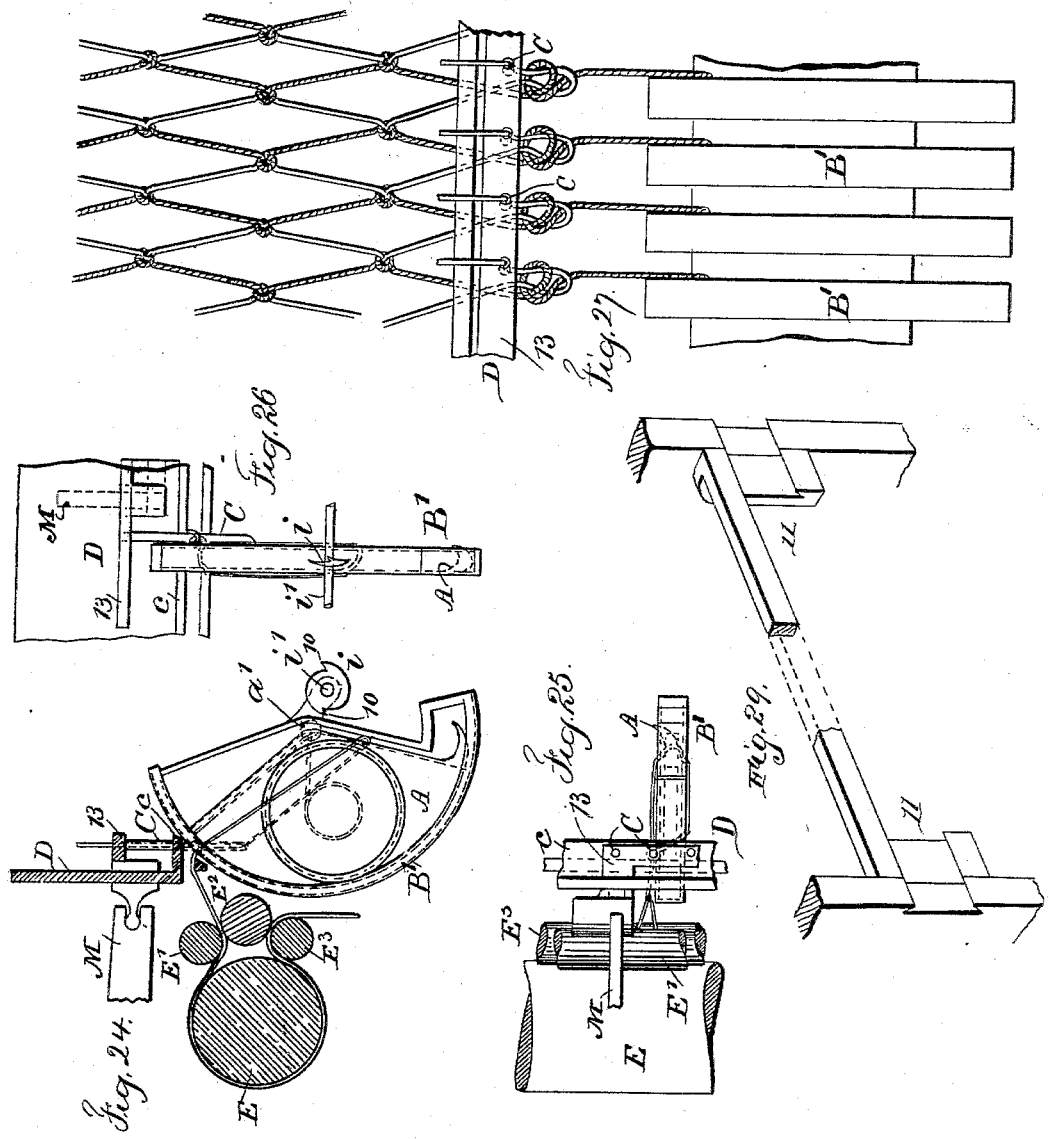

(No Model.) 7 Sheets—Sheet 7.
K. V. KARLANDER.
MACHINE FOR MAKING NETS.
No. 597,909. Patented Jan. 25, 1898.
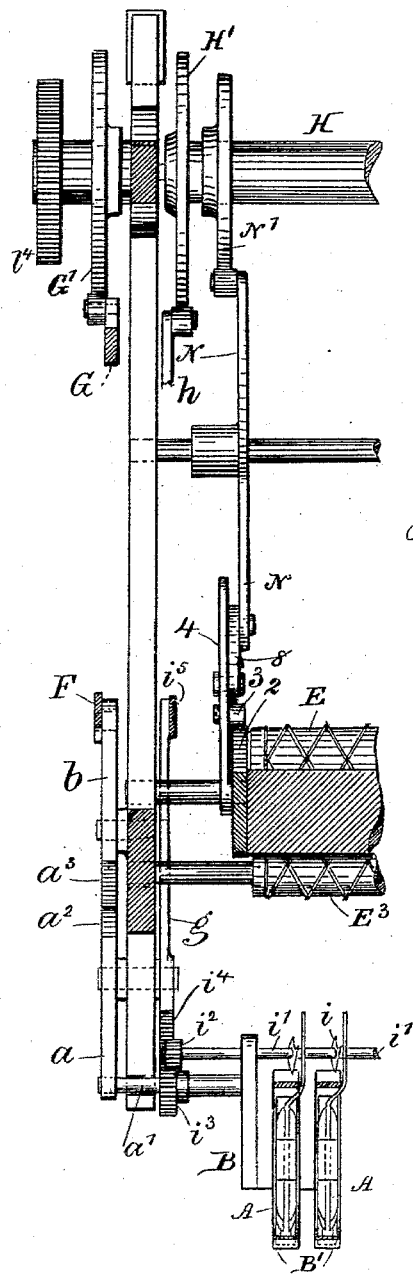
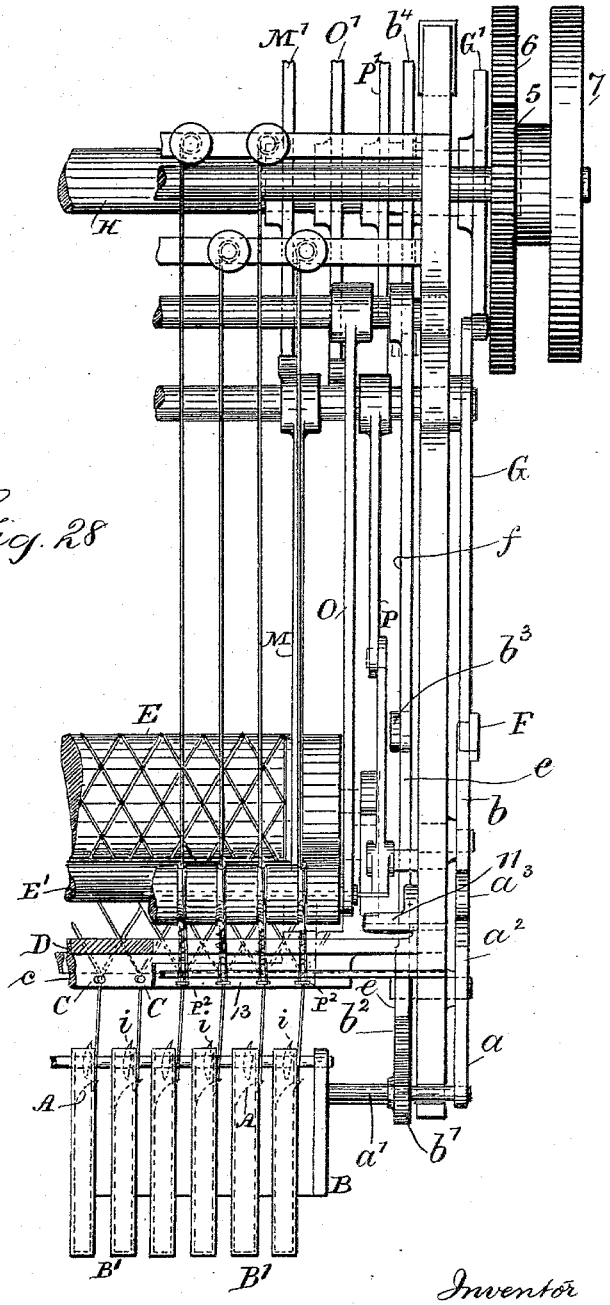
Fig. 28
Witnesses
Chas H. Smith
J. Staib
Inventor
K. V. Karlander
Lemuel W. Serrell
Atty

UNITED STATES PATENT OFFICE.

KARL VIKTOR KARLANDER, OF STOCKHOLM, SWEDEN, ASSIGNOR TO K. KARLANDER'S NATMASKINSAKTIEBOLAG.

MACHINE FOR MAKING NETS.

SPECIFICATION forming part of Letters Patent No. 597,909, dated January 25, 1898.

Application filed May 6, 1895. Serial No. 548,253. (No model.)

*To all whom it may concern:*

Be it known that I, KARL VIKTOR KARLANDER, manufacturer, a subject of the King of Sweden and Norway, residing at No. 8 Barnhusgatan, Stockholm, Sweden, have invented certain Improvements in Machines for Making Nets, of which the following is a specification.

In my improved machine for making nets a range of tubular needles is provided that can be raised and lowered and also moved laterally from one position to another. These carry the warp-threads, and the weft-threads are supplied from shuttles in cases upon a frame that receives a partial revolution first in one way and then in the other, and there are loop-formers composed of concave disks with projecting hooks upon the edges that engage the weft-threads as they pass from the shuttles to the edge of the net, and by a partial revolution the weft-threads are looped for the tubular needles to pass through the loops and hold them while the loop-formers are disengaged from the weft-threads by being turned backwardly. The shuttles are then passed through the loops of warp-threads from the tubular needles and the loops are drawn up to tie the warp and weft threads in a range of knots and the tubular needles are moved laterally between the tying of one range of knots and the next in forming the net. A machine provided with the said arrangements is represented in the annexed drawings, in which—

Figure 1:
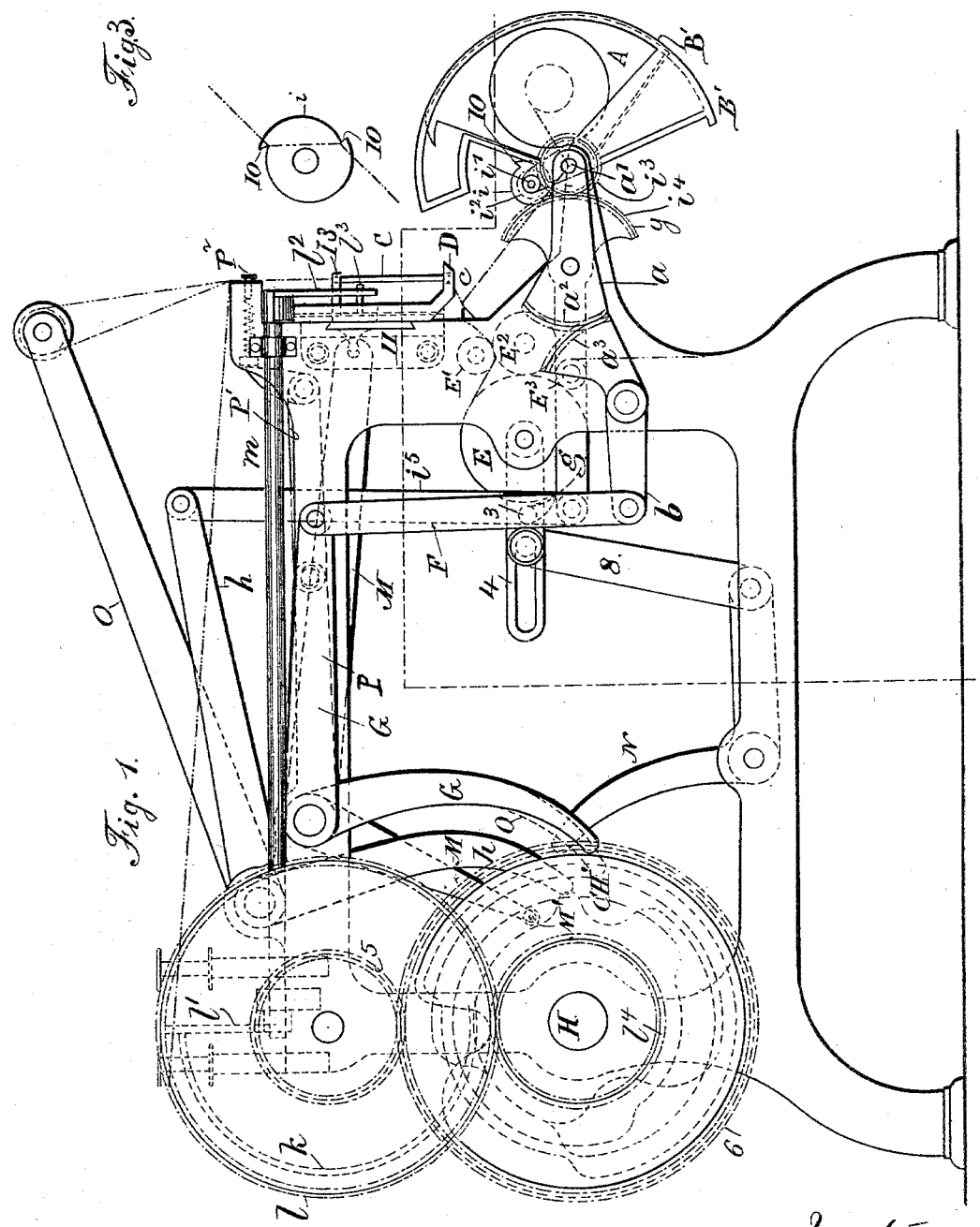
Figure 2:
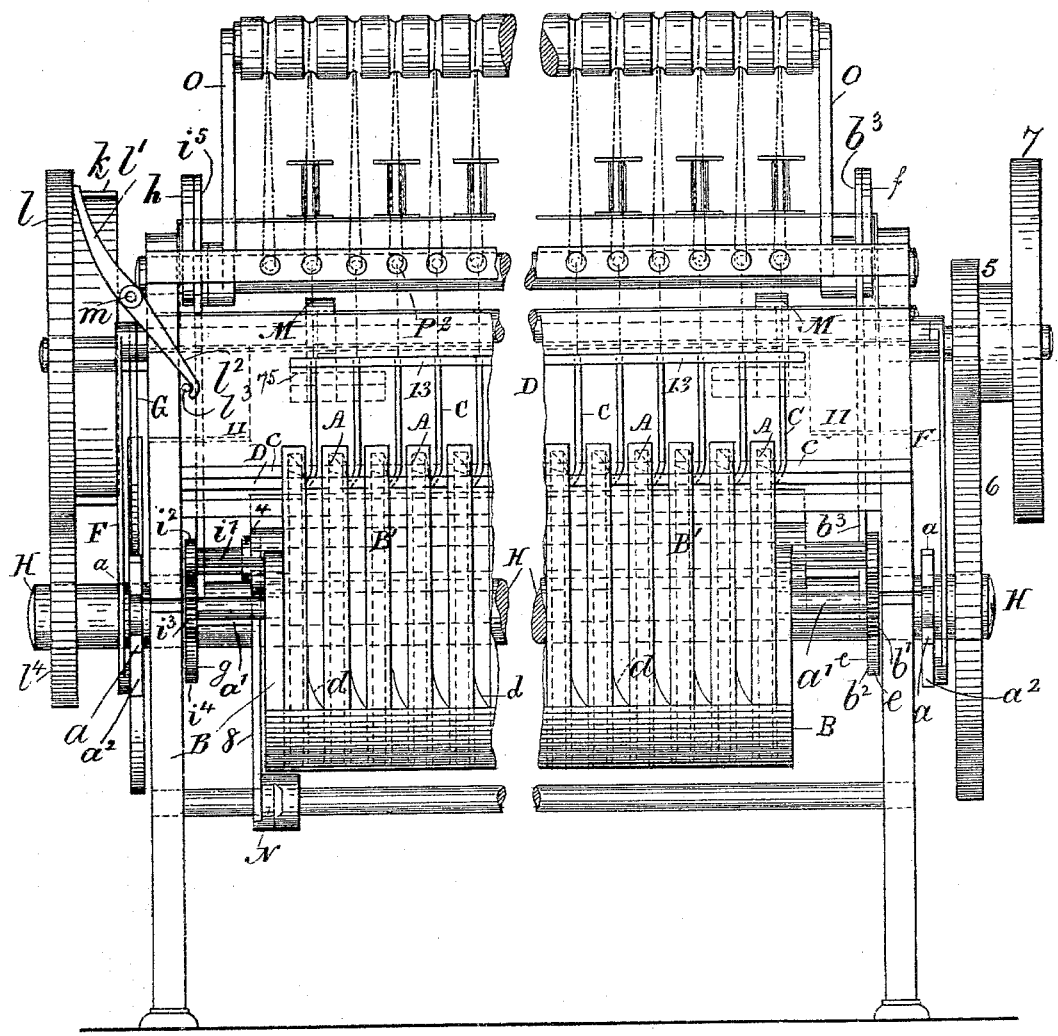

Figure 1 shows it in a side elevation; Fig. 2, in front elevation, and Fig. 3 a detail of a loop-forming disk shown by a side view. Fig. 4 is a horizontal and Fig. 5 a vertical section through the working parts. Figs. 6 to 14 are details showing the manner in which the knots are being formed. Fig. 15 is a detached view of one of the shuttle-cases and shuttles, and Fig. 16 is a plan view of the same. Fig. 17 is a similar view to Fig. 15 with the parts in the position corresponding to the diagram Fig. 9. Fig. 18 is an elevation, and Fig. 19 a plan view, of the parts shown in Fig. 17. Fig. 20 shows the parts with the shuttle entering the loop of needle-cord in nearly the positions illustrated in the diagram Fig. 12. Fig. 21 is an elevation, and Fig. 22 a plan view, of the parts represented in Fig. 20. Fig. 23 shows the parts in nearly the positions illustrated in the diagram Fig. 11. Fig. 24 shows the parts with the loop of needle-cord passing around the shuttle, as illustrated in the diagram Fig. 13. Fig. 25 is a plan, and Fig. 26 an elevation, of the parts shown in Fig. 24. Fig. 27 is a diagrammatic illustration of the knots as tied alternately, and Fig. 28 is a diagrammatic plan view, partially in section, to indicate the relative position of the parts. Fig. 29 is a perspective diagram showing portions of the side frames and the bearings for the cross-sliding needle-frame. Fig. 30 is a perspective view showing a portion of the needle-frame at one end, needles, and a part of the needle-bar. Fig. 31 is a side view of one of the concave disks. Fig. 32 is an edge view of the same in one direction, and Fig. 33 is an edge view in the other direction.

The shuttles A are in cases or boxes B' in a frame B on the front end of the machine, which frame is pivoted at $a'$ in the ends of levers $a$. The other ends of said levers are made as toothed segments $a^2$ $a^2$, meshing into toothed segments $a^3$ $a^3$ at the forward ends of levers $b$ $b$. These levers $b$ are pivoted on each side frame of the machine and connected to levers G G by the links F F, and said levers G G are moved by cams G' G' on the main shaft H. By this arrangement the frame B is moved to or away from the lower end $c$ of the needle-frame D, which frame is placed also on the front end of the machine.

Each shuttle-case B' is an open segmental frame and fastened at its lower edge to the frame B. The number of shuttle-cases corresponds to the number of needles and the cases are sufficiently thin to pass in between the needles.

The shuttles A are segmental to fit into the segmental shuttle-cases, such shuttle-cases being trough-shaped, as seen in Fig. 4, to receive and hold the shuttles; but the shuttles are sufficiently loose within the cases for the loops of cord to pass around such shuttles. Each shuttle has a point projecting laterally from the case, as seen in Fig. 28, to engage the cord in taking the loops, as hereinafter described, and each shuttle has a central opening for the reception of a bobbin or cop of weft thread or cord, and any desired tension device may be used for regulating the tension upon the weft-cords as they are drawn up in tying the knots.

Sometimes I employ springs $d$, Fig. 2, to steady the shuttles in position, and the cord-loops draw through between such springs and the shuttles as the shuttles pass through the loops of needle-cords illustrated in Fig. 13.

The frame B is partially revolved by a cog-wheel $b'$, secured to its shaft and meshing with a toothed segment $b^2$ on a lever $e$, (see Fig. 28,) and the other end of said lever $e$ is connected to a lever $f$ by means of a link $b^3$. The lever $f$ is also actuated at the proper time by a cam $b^4$ on the main shaft H. The loop-formers are each made as a concave disk $i$, with two nearly opposite projecting hooks 10, the points of which are bent outwardly on the concave side of the disk, as seen in Fig. 3, and said loop-formers are fixed on a shaft $i'$, supported near its ends in arms that extend out from the end portions of the frame B. (See Figs. 4 and 28.) To one end of this shaft $i'$ there is firmly attached a cog-wheel $i^2$, meshing into a cog-wheel $i^3$, loose on the shaft $a'$ of the frame B, and said wheel $i^3$ gears into a toothed segment $i^4$ on one arm of a lever $g$, the other arm of which is connected by a link $i^5$ with a lever $h$, and said lever $h$ is actuated by a cam $H'$ on the shaft H. By this means the loop-formers $i$ are revolved when the frame is being raised toward $c$ and the hooks of the disks engage the weft thread or cord and form it into loops.

The warp thread or cord is led through hollow tubular needles C, the lower ends of which are each bent in the same direction. The tubular needles C are supported in the frame D, that is sustained near its end by V-shaped slide-bearings 11, Figs. 1, 2, 4, 5, and 28, that allow the frame to be moved endwise, so that the needles are carried thereby laterally from one position to the other, and the needles are fitted to slide through guides $c$ and they are connected at their upper ends to a bar 13, by which the needles can be moved up or down in taking the loops and tying the knots. The devices for sustaining and moving the needles may be of any desired character. The bar 13 has rearward projections passing through vertical slots in the frame D, (see Figs. 5, 16, 19, 23, 24, 25, and 30,) and the levers M act upon these projections to raise and lower the bar and needles, such levers M receiving motion from suitable cams $M'$ on the shaft H.

Underneath the needle-frame D there are placed rollers E $E'$ $E^2$ $E^3$ for conveying away the net in proportion as it is made and to which the threads from the needles and the shuttles are led. The roller E may be actuated by any take-up device, such as a ratchet-wheel 2 upon the roller E and a pawl 3 on the arm 4, which latter is connected by a link 8 to a lever N, actuated by a cam $N'$ on the shaft H.

The operation of the above-described parts is as follows: When the machine is started, the frame B is upward and toward the lower end $c$ of the needle-frame D and brings with it the loop-formers $i$, which are partially revolved and by means of their hooks engage the weft, which is thus stretched across the concave side of the disk from one hook to the other, and it is laid crosswise upon the convex side of the disk, the end of the weft running out from the shuttle lying uppermost, Figs. 7 and 8. After the loop-formers have reached $c$ the needles C descend, thereby introducing their bent ends through the opening between the stretched weft and the loop-formers, the warp being led through the needle and passing back alongside the latter and thus entering, together with it, through the loop in the weft. The frame B, together with the loop-formers, then returns and the loop-formers partially revolve in an opposite direction, thus disengaging the weft, Figs. 9, 10, and 11. As the needles remain in their present position, the loops already formed in the weft will be thus delivered around the needles and the warp, and the warp-cords pass out from the tubular needles and upwardly and form loops to be taken by the shuttles. The frame B now receives a partial revolution and the points of the shuttles pass between the warp-cords and the bent ends of the tubular needles. (See Figs. 12 and 13.) Each shuttle which is lying free in its case is passed through its loop of warp-cord and the loops are drawn off, as seen in Fig. 13, and the frame, with the shuttles, is then moved backwardly and downwardly, leaving the threads interlocked, as illustrated in Fig. 14, ready to be drawn up and tightened. As the needles ascend the knots are tightened and the net is drawn back by the take-up mechanism for the next row of knots to be tied. The needle-frame is moved, carrying the needles laterally, so that each needle will act with the loop-forming devices next to the ones that had before acted with such needles in forming another row of knots, and then the needle-frame and needles are returned to their former position and the operations repeated. Hence the knots that unite the warp and weft threads are alternated to form the meshes of the net, as illustrated in Fig. 27. The number of the needles and the corresponding shuttles may be varied according to the desired width of the net. Motion is communicated to the main shaft H through the gearing 5 and 6 by power applied to the wheel or pulley 7. The warps pass from spools or bobbins around guide-pins and up over a roller or bar carried by the levers O and thence to the needles, and the knots are tightened at the proper time by raising the roller by the levers O, such levers O being acted upon by suitable cams $O'$ on the shaft H, and clamps may be employed, as usual, to hold the cords as the knots are finally tightened, such clamp being indicated at $P^2$, and they are actuated by the levers P and cam $P'$. Any suitable form of clamp may be employed, those represented being in the form of spring-buttons, around which the cords pass, the pressure of the spring on the buttons being relieved by the levers. The lateral movement of the needle-frame is performed by a semicircular rib $k$ on the cog-wheel $l$ acting upon an arm $l'$, firmly connected with a shaft $m$ and pressed against the wheel $l$ by means of a spring or otherwise. The shaft $m$ carries a second arm $l^2$, firmly connected therewith and acting upon a projection $l^3$ on the needle-frame. The gear $l$ receives its movement from a gear $l^4$ on the shaft H. A complete knotting operation will be performed by each revolution of the shaft H, and the wheel $l$ is revolved once every two revolutions of the shaft H.

The dotted lines in Fig. 1 illustrate the general contour of the respective cams for giving to the levers and parts connected therewith the necessary motions at the proper times, and the general positions of the cams are indicated in Fig. 28, and these cams correspond generally to those heretofore employed in machinery of this character.

I claim as my invention—

1. The combination in a machine for making nets, of a range of tubular needles and means for carrying and actuating the same, the warp-threads passing through such needles, a range of shuttles each having a bent point and means for moving the same to engage loops of warps from the needles and through which loops the shuttles are passed, a range of loop-formers each composed of a disk with projecting hooks and means for partially revolving such formers and making loops in the weft-threads for the tubular needles to pass into, such loop-formers being turned backwardly to discharge the loops upon the tubular needles, substantially as set forth.

2. The combination in a machine for making nets, of a range of needles, means for moving the needles endwise and for carrying the range of needles laterally to change their positions in relation to the shuttles, a range of shuttles having projecting points and carrying weft-threads, cases for said shuttles and a frame and means for moving the shuttles and cases to carry the shuttles through the loops of weft-threads, a shaft and a range of concave disks having hooks projecting at opposite sides of such disks, and means for partially revolving such disks to seize the weft-threads and form loops in the same through which the warp-needles pass and which loops are left around the warp-needles as the loop-formers are turned backwardly, substantially as set forth.

3. The combination in a machine for making nets, of tubular warp-needles, mechanism for giving motion to the same and shuttles adapted to receive cops or bobbins of weft-threads and having projecting points, cases B' receiving such shuttles, a frame B and shaft $a'$ supporting the cases, and mechanism for giving a partial revolution to the frame and cases for carrying the shuttles through the loops of warp-threads and loop-forming disks, substantially as set forth.

In testimony whereof I have signed my name to this specification in the presence of two subscribing witnesses.

KARL VIKTOR KARLANDER.

Witnesses:
 CARL L. A. FRANC,
 V. LÖNNGVIST.